No. 649,236. Patented May 8, 1900.
H. W. DALY.
APAREJO.
(Application filed Aug. 7, 1899.)
(No Model.) 4 Sheets—Sheet 1.

Attest
M. F. Smith
Alfred A. Eicks

Inventor:—
Henry W. Daly:—
By Kigdon Longan attys.

THE NORRIS PETERS CO., PHOTO-LITHO., WASHINGTON, D. C.

No. 649,236. Patented May 8, 1900.
H. W. DALY.
APAREJO.
(Application filed Aug. 7, 1899.)
(No Model.) 4 Sheets—Sheet 2.
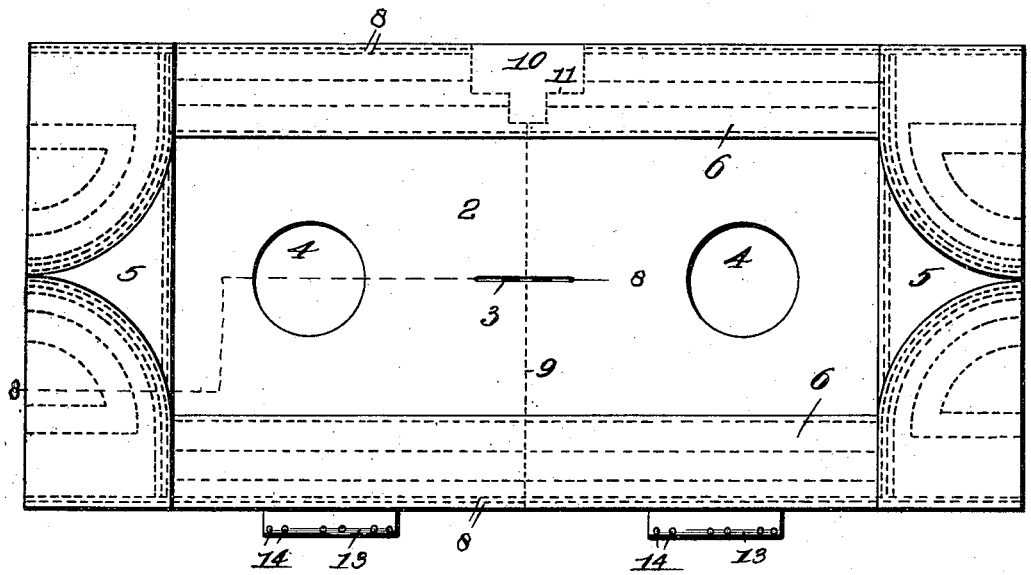
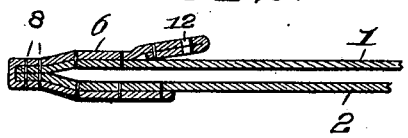
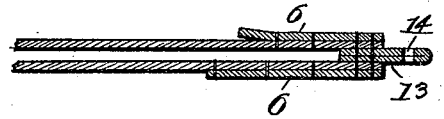
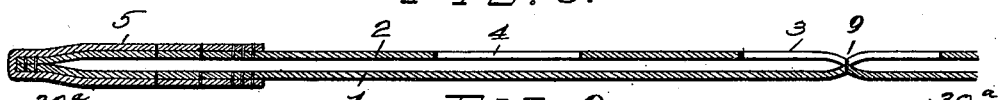
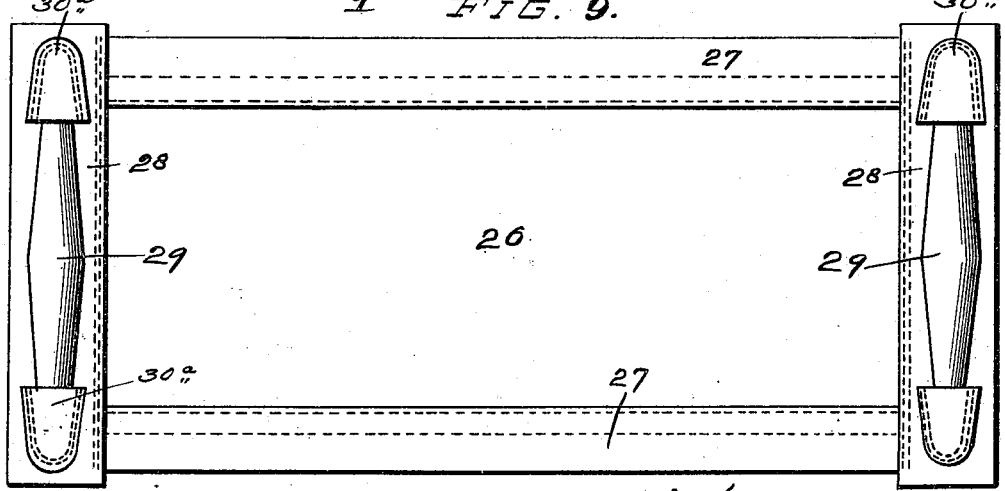
Inventor:—
Henry W. Daly.

No. 649,236. Patented May 8, 1900.
H. W. DALY.
APAREJO.
(Application filed Aug. 7, 1899.)
(No Model.) 4 Sheets—Sheet 3.

Attest:
M. F. Smith
Alfred A. Eicks

Inventor:
Henry W. Daly:—
By Higdon & Longan Attys.

THE NORRIS PETERS CO., PHOTO-LITHO., WASHINGTON, D. C.

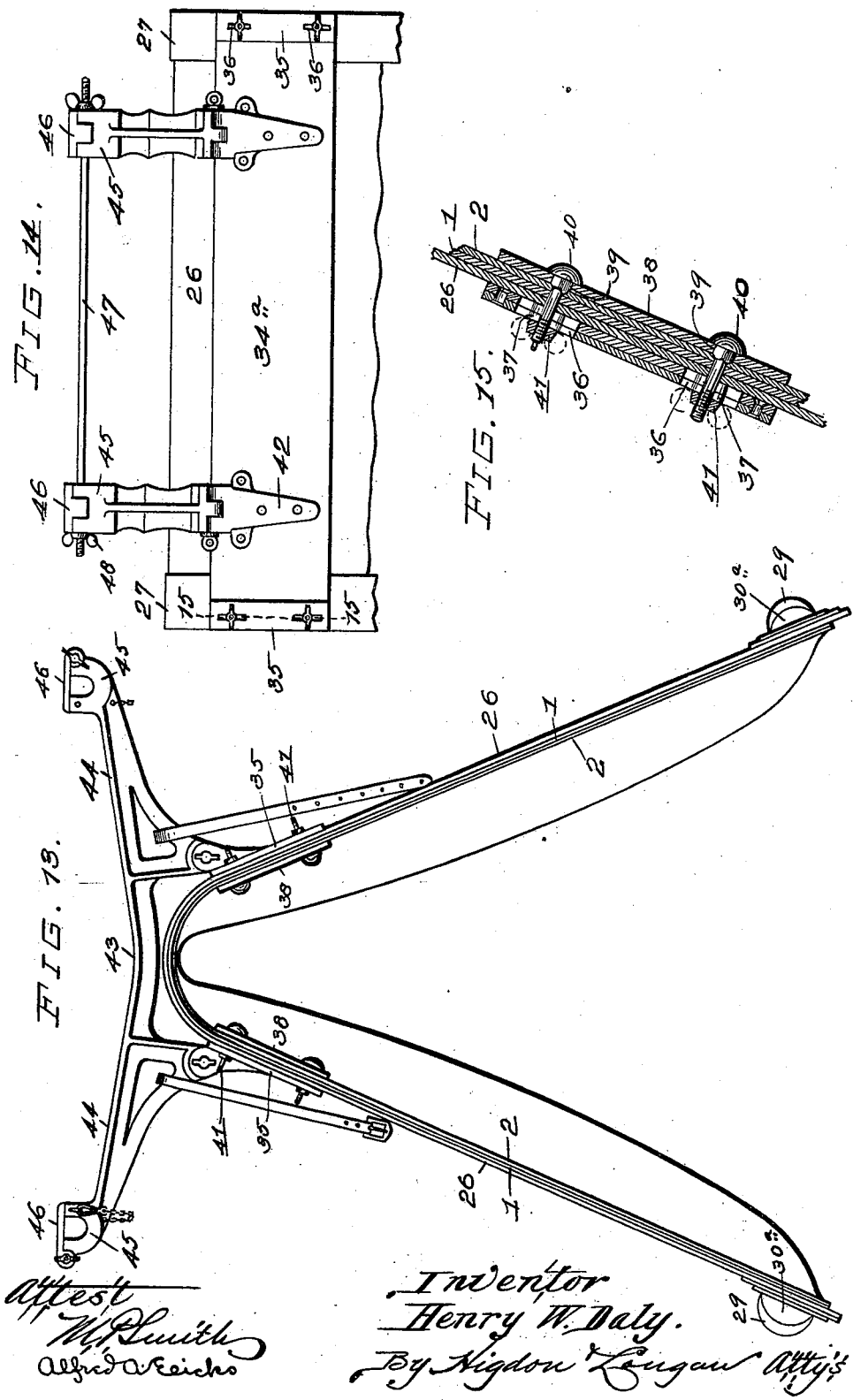

UNITED STATES PATENT OFFICE.

HENRY W. DALY, OF THE UNITED STATES ARMY.

APAREJO.

SPECIFICATION forming part of Letters Patent No. 649,236, dated May 8, 1900.

Application filed August 7, 1899. Serial No. 726,387. (No model.)

*To all whom it may concern:*

Be it known that I, HENRY W. DALY, of the United States Army, stationed at Jefferson Barracks, Missouri, have invented certain new and useful Improvements in Aparejos, of which the following is a full, clear, and exact description, reference being had to the accompanying drawings, forming a part hereof.

My invention relates to improvements in an aparejo; and it consists of the novel construction, combination, and arrangement of parts hereinafter shown, described, and claimed.

Figure 1:
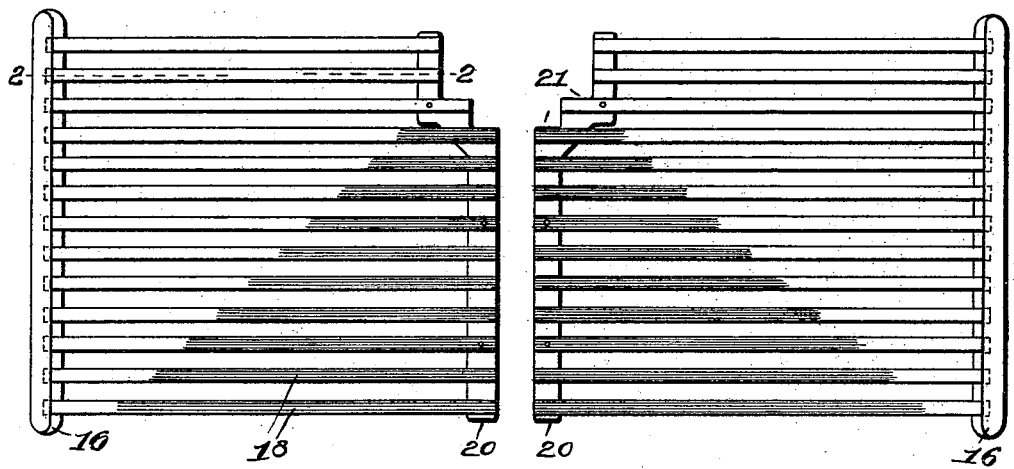
Figure 2:
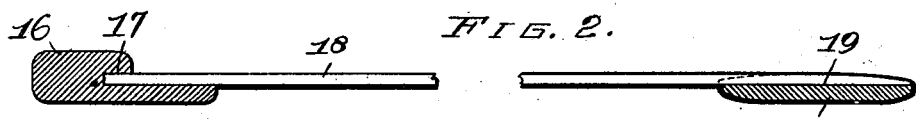
Figure 3:
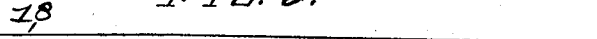
Figure 4:
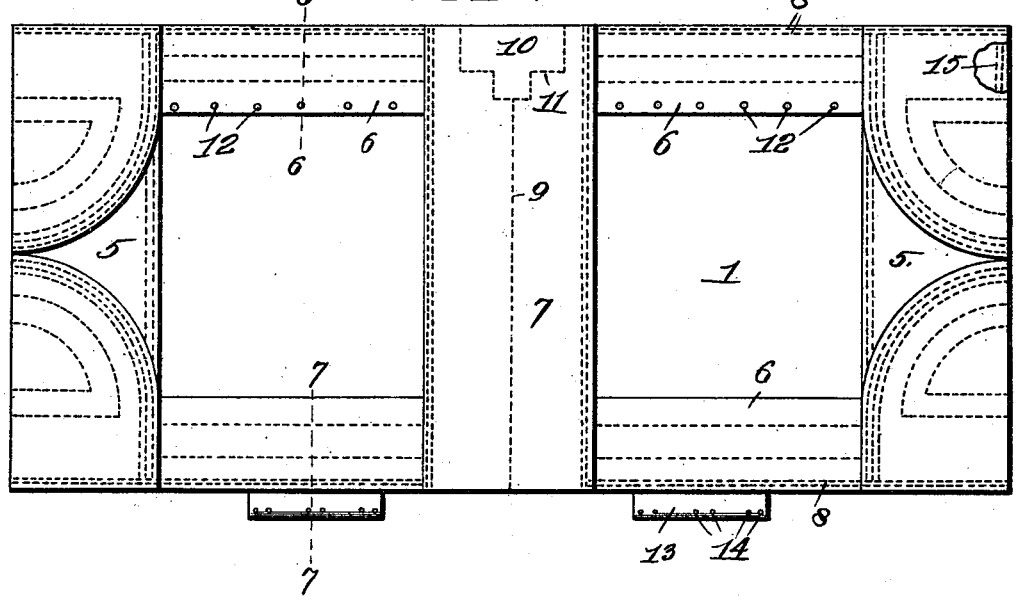
Figure 10:
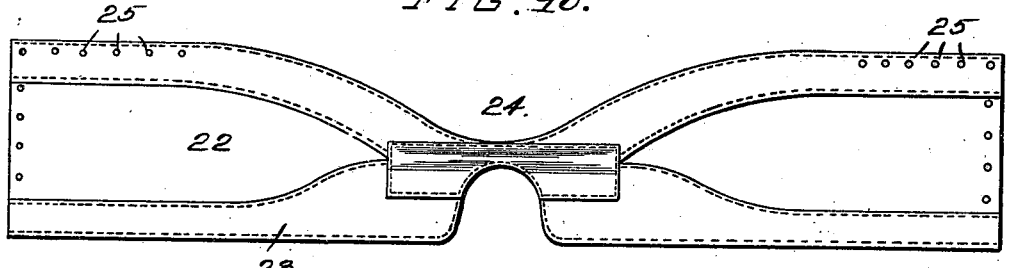
Figure 11:
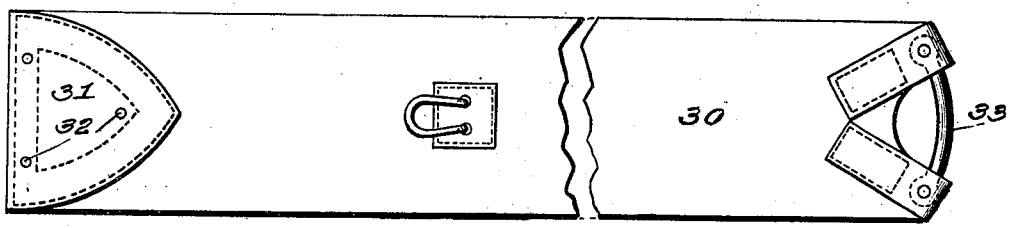
Figure 12:
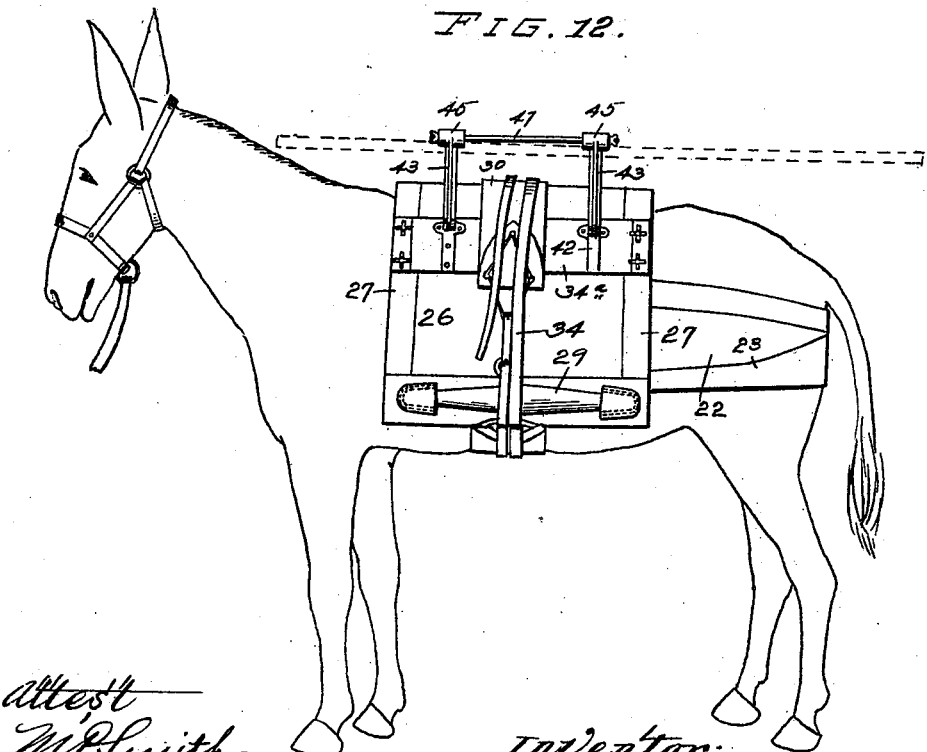

Figure 1 is a plan view of the skeleton frames composed of ribs, center pieces, and end pieces, which frames are arranged upon the interior of the aparejo. Fig. 2 is an enlarged sectional view taken approximately on the line 2 2 of Fig. 1. Fig. 3 is a side elevation of one of the ribs made use of in these frames. Fig. 4 is a plan view of the outside of the aparejo. Fig. 5 is a plan view of the inside thereof. Fig. 6 is an enlarged detail sectional view taken approximately on the line 6 6 of Fig. 4. Fig. 7 is an enlarged sectional view taken approximately on the line 7 7 of Fig. 4. Fig. 8 is an enlarged sectional view taken approximately on the line 8 8 of Fig. 5. Fig. 9 is a plan view of the outside of the aparejo-cover. Fig. 10 is a plan view of the crupper used in connection with the aparejo. Fig. 11 is a plan view of the cinch used in fastening the aparejo on an animal. Fig. 12 shows the aparejo and crupper in position upon an animal. Fig. 13 is an end elevation of the aparejo and showing a detachable platform in position thereon, which platform is adapted to receive a stretcher. Fig. 14 is a side elevation of this stretcher-platform. Fig. 15 is an enlarged vertical sectional view taken approximately on the line 15 15 of Fig. 14.

In the construction of my improved aparejo I make use of a rectangular sack or casing composed of two sections of leather or analogous material, the top or outer section 1 being imperforate and the inner section 2 being provided at its center with the longitudinally-extending slot 3 and being also provided with the circular apertures 4 a slight distance from the ends of said slot 3. Arranged upon the ends of the sections so formed are the end facings 5, and arranged along the sides of the sections 1 and 2 are the facings 6. Extending transversely across the center of the outside facing 1 is a center facing 7, and all of the facings 5, 6, and 7 are securely stitched or sewed to the sections 1 and 2. The marginal lines of stitching 8 pass through the edges of the sections 1 and 2 and also through the edges of the facings 5 and 6, and the remainder of the stitching that secures the various facings to the sections 1 and 2 passes only through the facings and that one of the sections 1 or 2 on which they are located. A single row of stitching 9 extends transversely across the center of the center facing 7, which stitching passes through both of the sections 1 and 2, and a T-shaped section 10, which is termed the "collar" of the aparejo, is formed by the stitching 11 at the front end of the aparejo and in the center of the section 7. Formed in the inside edge of the facing 6, that lies directly against the top section 1, is a plurality of apertures 12, and held by the stitching at the rear end of the sack or casing so formed and between the sections 1 and 2 on each side of the center facing 7 are the rearwardly-projecting sections 13, in which is formed a plurality of pairs of apertures 14. The ends of the sections 1 and 2 are held together by the transversely-arranged marginal rows of stitching 15, and located immediately against these rows of stitching and between the ends of the sections 1 and 2 are the transversely-arranged iron bars 16. The outer halves of these bars 16 are formed approximately twice as thick as are the inner halves, and extending into the thickened outer portions are the recesses 17, the same being arranged at uniform distances apart. Removably positioned in these recesses 17 are the lower ends of resilient metallic ribs 18, the upper ends of which ribs rest in slots 19, formed in the bars or center irons 20, which center irons lie between the sections 1 and 2, immediately against the single row of stitching 9, and the forward ends of these center irons 20 diverge and are formed with the shoulders 21, which fit directly against the row of stitching 11, which forms the collar of the aparejo. The ribs 18, that terminate upon the shouldered or collar portion of the center irons 20, are of the same size throughout their lengths, and the thickness of the remaining ribs is tapered toward said center irons 20, the length of the taper of each succeeding rib being gradually increased until the last rib is reached, which last rib tapers nearly its entire length. The arrangement of this stepped or increasing taper of the ribs 18 is illustrated by the shading of said ribs in Fig. 1, and said ribs are so tapered in order that the aparejo will readily conform to the contour of the animal's back upon which it is positioned. A plurality of apertures are formed through the center irons 20, and rivets are passed through said apertures and through the section 1 in order to securely locate said center irons in their proper positions and to bind the ribs 18 in the slots 19 in said center irons 20. The iron bars 16 and center irons 20, together with the ribs 18, are inserted between the sections 1 and 2 through the slot 3 and apertures 4, and after the ribs have been properly positioned in the irons 16 and 20 a suitable quantity of packing, such as black moss or curled hair, is inserted between the ribs 18 and the inner section 2, thus padding the aparejo, so that it will rest in an easy manner upon an animal's back. When the parts of the frame are thus assembled and the center irons 20 have been securely attached by means of rivets, as described above, the ribs 18 are retained in the grooves 19 in the center irons 20 by the sides 1 and 2, between which said center irons 20 are riveted.

The crupper for the aparejo comprises the elongated section 22, of leather or analogous material, the top and bottom edges of which are bound with the reinforcing-strips 23, and the center of the top of the crupper is curved downwardly, as indicated by 24, and formed in the end and top edge of the end of said crupper is a plurality of apertures 25, through which is passed a suitable cord or lacing which secures the crupper to the aparejo, said cord or lacing being passed through the apertures 12 and pairs of apertures 14.

The aparejo-cover comprises a rectangular section 26 of canvas, the side edges of which are provided with the leather faces 27, and located upon the top side of the ends of said cover are the transversely-arranged facings 28 of leather or analogous material, upon top of which facings 28 are located the bars 29 of wood or analogous material, the ends of which are seated in leather cups 30ª, which are sewed directly to the ends of the facings 28.

The cinch of the aparejo comprises a broad band 30 of canvas, one end of said section of canvas being provided with the triangular facing 31 of leather or analogous material, through which facing is formed a plurality of apertures 32, and carried by the opposite end of said cinch is a curved bar 33, to which a strap 34 is secured in any suitable manner, which strap is made use of to secure and tighten the cinch around the aparejo and animal's body. A suitable cord or strap is passed through the apertures 32, to which cord or strap the strap 34 connects when the cinch is secured in position.

The stretcher platform or frame used in connection with the aparejo for carrying and retaining the stretcher is detachable from the aparejo, said platform comprising a pair of rectangular plates 34ª, which occupy positions in each side of the center of the aparejo, and the ends of said plate 34ª are reinforced or doubled in thickness, as indicated by 35, and formed through said reinforced or doubled ends are the vertically-arranged slots 36, the same being provided with the enlarged centers 37. Vertically-arranged metallic plates 38 are located beneath the side edges of the inner or lower section 1 of the aparejo-casing on each side of the center thereof, and formed through said plates 38 are the rectangular apertures 39, which receive the square shoulders formed on bolts 40, which bolts pass through said plates 38 and upwardly through the edges of the aparejo-casing and edge of the aparejo-cover, the outer screw-threaded ends of said bolts 40 receiving winged nuts 41 of such size as will readily pass through the vertically-arranged slots 36 when said winged nuts are turned to bring the wings in alinement with said slots 36. In this manner the plates 34ª and 38 are made detachable from the aparejo. Secured in any suitable manner to the plates 34ª, adjacent the ends thereof, are the brackets 42, to the upper ends of which are detachably secured the lower ends of cast brackets or frames 43, the same being provided with the outwardly-projecting arms 44, and integral with the outer ends of said outwardly-projecting arms are the U-shaped lugs 45, the same being adapted to secure the side rails of the stretcher-frame, and hinged to the outer portions of said lugs 45 and arranged to close the openings into said lugs are the plates 46, the means used to hinge said plates to said lugs 45 comprising a longitudinally-extending rod 47, the ends of which pass through the outer portions of the lugs 45 on one side of the platform and through the plates 46, operating upon said lugs, and winged nuts 48 are located upon the screw-threaded ends of said rods 47, which project beyond said lugs 45.

In positioning the aparejo on an animal's back for use a suitable padded saddle-cloth is first positioned on the animal's back, after which the aparejo is placed directly on said saddle-cloth, and the crupper is now placed in position, with its ends lying directly against the sides of the aparejo, and a suitable cord or lacing is passed through the apertures 25 and apertures 12 and 14. The aparejo-cover is now positioned immediately over the aparejo, after which the cinch 30 is passed around the animal's body with the aparejo and aparejo-cover thereon, and the cinch-strap 34 is engaged around the curved bar 33 and also through the lacing or cord that passes through the apertures 32 in the triangular reinforced end of said cinch, and as said strap 34 is tightened and strapped, so as to be securely held, it will securely position the aparejo and the aparejo-cover in the desired position. The load to be packed by the animal is now ready to be positioned on the aparejo, said load being held in any suitable manner, but preferably retained in position by a rope such as commonly used in retaining loads upon pack-animals.

When the platform seen in Figs. 13 and 14 is attached to the aparejo, the plates 38 are positioned at the proper points beneath the aparejo, after which the bolts 40 are passed through the apertures in said plates, and then the brackets or frames 33, carrying the plates 34ª, are positioned immediately over the top of the aparejo, the ends of said plates 34ª lying directly over the plates 38, and in this position said bolts 40 will pass through the centers 37 of the slots 36. The winged nuts 41 are now located upon the screw-threaded ends of said bolts and are tightened thereupon, said nuts being finally turned so that the wings thereof are at right angles to the slots 36. This rigidly positions the platform upon the aparejo, which platform is made use of in carrying a stretcher, the side rails of said stretcher being positioned in the U-shaped lugs 45 when in use, and when being rolled up and transported said stretcher can be carried directly upon the centers of the frames or brackets 33 and retained in this position by means of suitable straps which are carried by said frames 43.

My improved aparejo is especially strong and durable from the fact that the irons 16 and 20 and ribs 18 are made use of, said ribs and irons forming frames which adjust themselves to the contour of an animal's back and sides, therefore resting very easily upon an animal, and said frames greatly assist in distributing the weight of the load carried by the animal.

I claim—

1. In an aparejo, a flexible casing, iron bars located in the ends of said casing, center irons located in the center of said casing, and a plurality of flexible ribs connecting the center irons with the iron bars, substantially as specified.

2. In an aparejo, a flexible casing, iron bars located in the ends of said casing, center irons located in the center of said casing, a plurality of flexible ribs connecting the center irons with the iron bars, certain of which ribs taper from their outer ends toward the center irons, substantially as specified.

3. In an aparejo, a flexible casing, reinforcing-bands for the ends and sides of said casing, a reinforcing-band across the center of the outside of said casing, and a pair of flexible frames removably positioned in said casing, substantially as specified.

4. In an aparejo, a flexible casing, a pair of skeleton frames arranged within said casing, a crupper detachably secured to said casing, a flexible cover for said aparejo, and a stretcher-platform detachably secured to said cover and aparejo, substantially as specified.

In testimony whereof I affix my signature in presence of two witnesses.

HENRY W. DALY.

Witnesses:
ALFRED A. EICKS,
M. GRIFFIN.